United States Patent [19]

Riggle et al.

[11] Patent Number: 5,588,030

[45] Date of Patent: Dec. 24, 1996

[54] APPARATUS AND METHOD FOR THE SYNCHRONIZATION OF DATA IN A BIT STREAM

[75] Inventors: C. M. Riggle, Colorado Springs; Marvin DeForest, Longmont, both of Colo.

[73] Assignee: Maxtor Corporation, Longmont, Colo.

[21] Appl. No.: 585,260

[22] Filed: Jan. 11, 1996

Related U.S. Application Data

[63] Continuation of Ser. No. 135,072, Oct. 13, 1993.

[51] Int. Cl.$^6$ ............................................. H04L 7/00
[52] U.S. Cl. ............................................. 375/368
[58] Field of Search ............................................. 375/368

[56] References Cited

U.S. PATENT DOCUMENTS

| | | | |
|---|---|---|---|
| 3,760,355 | 9/1973 | Bruckert | 340/146.2 |
| 4,414,676 | 11/1983 | Kraul et al. | 375/116 |
| 4,559,618 | 12/1985 | Houseman et al. | 365/49 |
| 4,646,328 | 2/1987 | Riou | 375/114 |
| 4,729,123 | 3/1988 | Wheen | 370/100 |
| 4,730,346 | 3/1988 | Jiang | 375/116 |
| 4,847,877 | 7/1989 | Besseyre | 375/116 |
| 4,879,731 | 11/1989 | Brush | 375/116 |
| 4,914,535 | 4/1990 | Weng | 360/72.2 |
| 4,933,786 | 6/1990 | Wilson | 360/78.14 |
| 5,204,883 | 4/1993 | Blanc | 375/116 |
| 5,243,471 | 9/1993 | Shinn | 360/48 |
| 5,260,776 | 11/1993 | Dolivo et al. | 375/94 |
| 5,297,185 | 3/1994 | Best et al. | 375/116 |

OTHER PUBLICATIONS

Schaub et al, Frame Synchronization for Spontaneous Transmissions, Globe Com '90:IEEE Global Telecommunications Conf., 1990 pp. 617–622.

Schaub, Improved Binary Frame Synchronization Scheme for Packet Trans. Electronics Letters, Mar. 17, 1988, V:24, Issue 6 pp. 301–302.

Dolivo et al, Freamble Recognition and Synchronization Detection in Partial Response Systems, Signals, Systems & Comp., 1991 25th Asilomar Conf., pp. 1–5.

Schaub, "Improved Binary Frame Synchronization Scheme for Packet Transmission", pp. 301–302, Mar. 17, 1988, *Electronics Letters*, vol. 24(6).

Schaub et al., "Frame Synchronization for Spontaneous Transmissions", pp. 617–622, 1990, IEEE Global Telecommunications Conference, Globecom '90.

*Primary Examiner*—Kevin A. Kriess
*Assistant Examiner*—Lucien Toplu
*Attorney, Agent, or Firm*—Sheridan Ross & McIntosh

[57] ABSTRACT

In the system of the present invention, the system includes a pre-synchronizer to eliminate the need for examining every possible substring preceding the EOP (end of preamble) mark in order to detect the EOP. For the case where autocorrelation techniques are used to provide error synchronization error tolerance, this results in a much shorter EOP, since it is possible to find shorter EOPs which do not falsely synchronize prior to the arrival of the true EOP. In particular, the preamble is utilized to perform pre-synchronization. Once pre-synchronization has been achieved, the search for the EOP can be focused on a subset of all possible substrings as opposed to prior techniques which looked at all possible substrings. The resultant system solves the problem with less logic and more error tolerance.

17 Claims, 5 Drawing Sheets

APPARATUS AND METHOD FOR THE SYNCHRONIZATION OF DATA IN A BIT STREAM

This is a continuation of copending application Ser. No. 08/135,072, filed on Oct. 13, 1993.

BACKGROUND OF THE INVENTION

1. Field of the Invention

The present invention relates to a method and apparatus for synchronizing a system to self-clocking data. More particularly, the present invention relates to a disk drive system which uses precoding and self-clocking data and the method and apparatus for the synchronization of the system to accurately read and write data.

2. Art Background

In systems which use precoding and self-clocking data, such as a disk drive system, there is a need to initiate data transfer by first synchronizing and correctly phasing the system clock for extracting data using startup preamble and synch fields. Once the data is synchronized, the start of the data transfer is identified and distinguished from data in the startup preamble and synch fields and read operations can be performed accurately.

Typically the bit string containing the preamble, EOP (end of preamble) mark and data, plus any subsequent information such as error correction codes (ECC) is then fed into a data separator to extract a clock from the detected signals and an EOP detector to detect the synch field. When the detector finds a match between the expected EOP and the actual EOP, the end of preamble is noted and subsequently all remaining bits are transferred to the data decoder, ENDEC, for further processing as user data or other data used by the system. The preamble and EOP are therefore effectively stripped away and not used again until the next read operation.

The identification of the start of the data transfer is typically performed with the aid of an "end of preamble" (EOP) mark or "byte synch" mark. Data itself typically is not used since it might happen to look like the preamble near the junction between the preamble and data. Problems arise when signals are small relative to received noise because there is considerable uncertainty about the received data, the preamble and the EOP mark which is used to distinguish between the end of the preamble and the beginning of data.

Prior techniques distinguish between preamble, end of preamble (EOP) mark and data even when the quality of each is poor. However, there is a cost of logic and overhead to compensate for poor quality signals. For simple systems with very low error rates, a short EOP is typically selected and the system looks in the EOP detector for a perfect match between the expected EOP and actual EOP. As the bit string is injected into the EOP detector, each contiguous set of bits (a bit substring) of length equal to the length of the EOP is compared to the expected EOP. As each new bit is entered, the comparison is repeated so that all possible EOP candidates are examined.

For systems with high error rates, there is a significant probability that a perfect match will not almost always be found. A loss of data will occur when a match is not found because the start of data cannot be correctly identified. Therefore it is preferable that an autocorrelation process is used to alleviate the need for a perfect match. An EOP is selected which has good autocorrelation properties relative to the preamble so that a "most likely" identification can be applied. To find such an EOP, exhaustive computer searches are performed which generate trial patterns and associated weights of perfect synchronization of the pattern and weights of all imperfect synchronizations. Preferably a pattern is selected for the EOP which exhibits the largest minimum difference in weights between perfect synchronization and imperfect synchronizations. The best pattern is one which simultaneously provides the needed difference, which is typically a function of the length of the pattern and expected error rate, and adds the fewest extra overhead bits and requires the least cost of hardware to implement.

The classical autocorrelation equation for discrete time signals is $$R_{xx}(k) = \frac{1}{N} \sum_{t=0}^{N} x(t)x(t-k),$$

where $R_{xx}(k)$ is the autocorrelation value, $x(t)$ is the signal pattern being examined, t is discrete time in T units, k is the discrete time offset between signal pattern $x(t)$ and $x(t-k)$ in T units, and N is the length of $x(t)$. There are multiple uses cited in the literature for the autocorrelation function but one such use is to detect in time when a specific signal pattern $x(t)$ has been received. This may typically be done by examining values of $R_{xx}(k)$ for all possible values of k, then setting a threshold for $R_{xx}(k)$ such that there is equal distance between $R_{xx}(0)$ and the next largest value of $R_{xx}(k)$. When searching in time for existence of the true $x(t)$, $R_{xx}(k)$ is repeatedly calculated and examined at all time intervals T until a value is found which exceeds the threshold. When the threshold is exceeded, it is most likely that $x(t)$ has been found and that k=0. For such a use, it is desirable that $R_{xx}(0)$ and the next largest $R_{xx}(k)$ exhibit as much distance as possible. This provides the greatest tolerance for signal error in the presence of noise. To do so, $x(t)$ is selected to provide the largest distance for a given length N.

Therefore, an EOP is selected which permits the best compromise between a large degree of imperfections but still can be recognized as the EOP and not as part of a preamble and an acceptable cost of hardware and overhead bits. Both conditions must be considered. In traditional practice, all prior bit substrings of length equal to EOP are compared to the expected EOP as well as the legitimate EOP bit substring when it arrives. The amount of logic required may be significant to accept a less than perfect EOP match since all legitimate combinations must be acceptable. For example, if there are m bits of an EOP examined and any n bits which match are acceptable to detect the EOP, then there $$\frac{m!}{n!(m-n)!}$$

legitimate combinations. To simultaneously examine each combination requires an n input AND gate and an OR tree sufficiently large to accumulate inputs from all AND gates. This is in addition to whatever detection logic is already present to recognize bit matches. For example, if m=10 and n=6, there are $$\frac{10!}{6!(10-6)!} = \frac{10!}{6!4!} = \frac{3628800}{720 \cdot 24} = 210$$

combinations requiring 210, 6 input AND gates and 42, 6 input OR gates. It is obvious that much larger logic arrays may be needed and the size of such arrays scale factorially as the number of bits examined increases. Therefore, it is desirable to find a strategy and an EOP which minimizes the number of bits m.

SUMMARY OF THE INVENTION

It is therefore an object of the present invention to provide an EOP string which minimizes the number of detected bits in the EOP mark and the logic required while providing an accurate method for detecting the end of the preamble and start of user data in the environment of low signal to noise.

It is an object of the present invention to provide an accurate but simple method and logic for synchronizing a system to an incoming self-clocking bit string.

In the system of the present invention, the system includes a presynchronizer to eliminate the need for examining every possible substring in the EOP in order to detect the EOP. This results in a much shorter EOP, since it is possible to find shorter EOPs which do not falsely synchronize prior to the arrival of the true EOP. In particular, the preamble is utilized to perform pre-synchronization. Once pre-synchronization has been achieved, the search for the EOP can be focused on a subset of all possible substrings as opposed to prior techniques which looked at all possible substrings. The resultant system solves the problem with less logic and overhead bits for a given or greater error tolerance.

BRIEF DESCRIPTION OF THE DRAWINGS

The objects, features and advantages of the present invention will become apparent to one skilled in the art from the following detailed description in which.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The present invention describes a method and apparatus for the detection of a specific bit string, specifically the end of preamble (EOP) string using a pre-synchronization step in conjunction with autocorrelation techniques in order to detect the EOP mark and therefore the beginning of user data. Although the system and method is described in the context of a disk drive, it is readily apparent that the inventive concepts can be applied to other systems which detect bit strings such as tape drives, transmission media and the like. Furthermore, the specific embodiment described herein is exemplary and it will be apparent to those skilled in the art that other forms of the inventive concepts described can be implemented.

To minimize the overhead, specifically, the number of bits required for synchronization and the logic required to synchronize the system to the bit stream read from the media, the process of synchronization is split into two portions. The first portion finds the first synchronization in a preliminary portion of the bit stream, preferably the preamble. In the second portion, autocorrelation techniques are used to synchronize to the bit pattern in order to determine where the data stream begins. However, for a given error tolerance, the autocorrelation pattern has been narrowed down to a fraction of its length if the first synchronization step were not performed as the first synchronization step identifies which substrings of bits to examine to detect the presence of synch.

Figure 1:
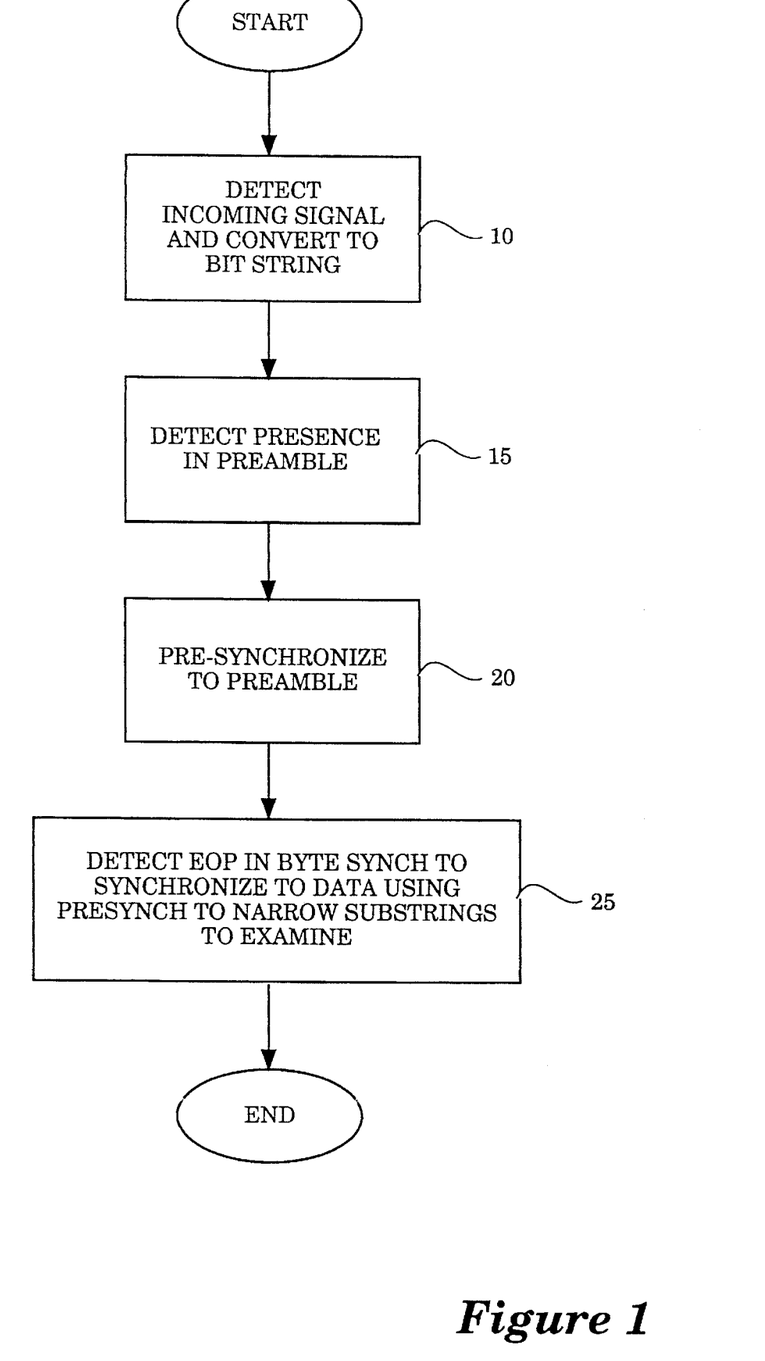
FIG. 1 is a generalized flow chart illustrating the process of the present invention.

The process is generally described with respect to FIG. 1. At step 10, the incoming signal is detected and converted into a bit stream. For example, in a disk drive, a read/write assembly comprising one or more channels will detect magnetic pulses on the media and convert those pulses to detected bits. Similarly, other forms of media may be utilized such as tape media and communications media. At step 15, the presence of the preamble is detected.

Figure 2:
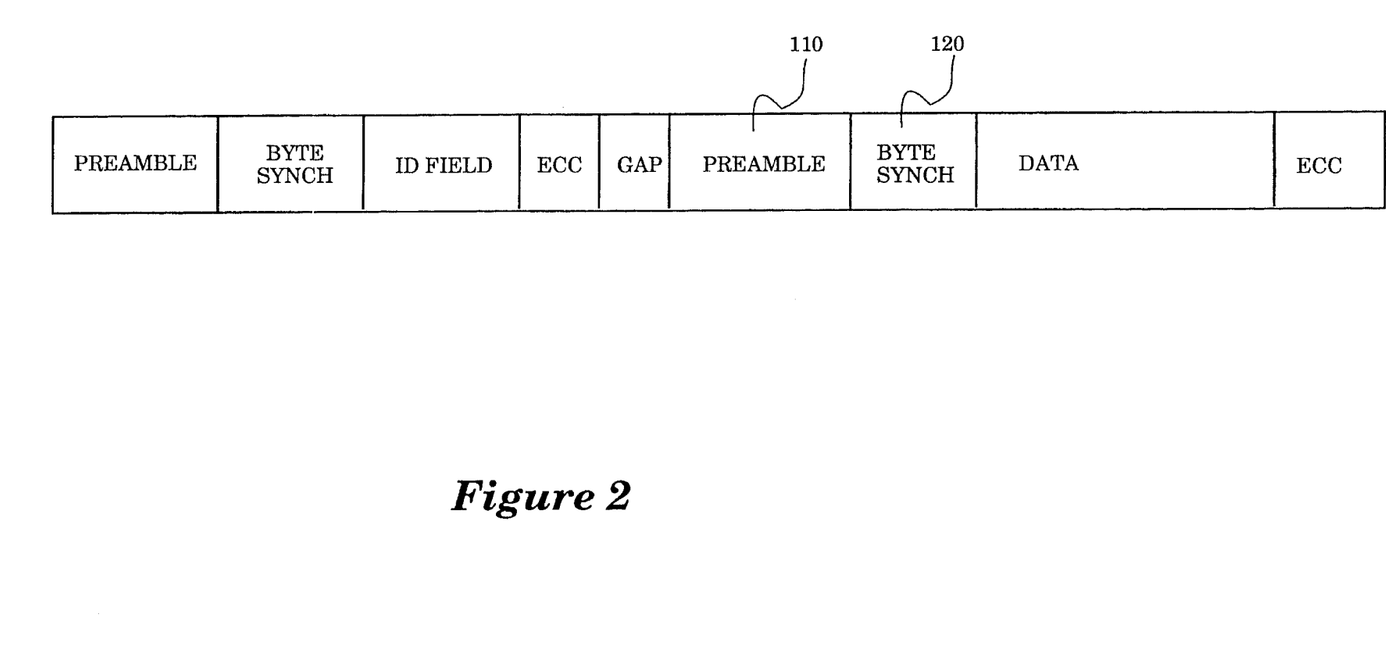
FIG. 2 illustrates an exemplary soft sector which includes data and the preamble and synchronization blocks employed in the present invention.

A typical data sector in the preferred embodiment comprises the fields illustrated in FIG. 2. Therefore, the system detects the preamble which includes a specific repetitive pattern to which the system can synchronize a clock to. More specifically, the preamble typically contains a repetitive sequence of "ones" and "zeros" which has the "ones" spaced by "zeros" to minimize time displacement of the bits due to inter-symbol interference and to provide a good compromise between large signal amplitude and the existence of a plurality of "ones" (magnetic transition or read back pulses) in a short period of time. One typical pattern is 010101010 . . . referred to as "2T" wherein the "ones" are spaced at 2T intervals where T is the time interval between adjacent bits. Another pattern is 010010010010 . . . referred to as "3T" wherein the "ones" are spaced at 3T intervals. The preamble is sufficiently long such that a phase lock loop can be synchronized to it in both frequency and phase for clock extraction. Once synchronized, synchronization can be maintained over random data sequences because recording codes are selected to guarantee presence of enough "ones" in the data.

Once the clock extraction system indicates that synchronization has been achieved, the system then looks for the EOP, step 25. To minimize the logic required to detect the EOP, it is realized that the preamble is repetitive and its repetition rate may be less than every bit position. Therefore, it is possible to consider looking for an EOP only at the completion of each repetitive cycle. For example, considering a 3T preamble, which contains repetitive cycles of 010, and knowing that the EOP must be preceded by a complete string of 010, the existence of the EOP is tested for at every third bit time rather than at every bit time. This is possible by the existence of the presynchronizer which identifies where the repetitive cycles of bits of the preamble end.

Using the clock synchronizer, the 1 bits in each cycle are detected for purposes of clock extraction. Therefore, the detection of the bits can also be used to establish which of the bits in the cycle apply to a particular bit position or time slot. Using the 3T preamble and the 1, 7 recording code typically utilized by the disk drive industry, the EOP can be synchronized using little additional logic as the time slotting process is already needed by the ENDEC. At a minimum, when executed at a specific place in the data path, only one additional AND gate is needed to complete the pre-synchronizer which correctly assigns bits to the ENDEC input. However, it may be desirable to utilize additional small amount of logic in order to provide some error tolerance in the pre-synchronizer. For example, using known error tolerance techniques, the pre-synchronization logic can examine successions of repetitive patterns and accept less than a perfect match that is within a predetermined error tolerance. This may be desirable when operating in a low signal to noise environment.

It is also possible and may be desirable to execute the presynchronization function in a less gate-efficient part of the system, e.g. the controller. In one implementation, pre-synchronization is executed in the controller to provide flexibility for accepting either serial data or unsynchronized 3 bit parallel data as input to the controller. This implementation includes an error tolerant capability by insisting that two or more (selectable) successive pre-synchronization of the 3T preamble exist before pre-synchronization is accepted. There are many possible strategies for implementing the algorithms in logic. One strategy includes a 3 bit input register which can be fed either serially or in parallel, an extended 2 bit register to hold the two bits accepted immediately prior to the three bits held in the 3 bit register, logic to detect which synchronization pattern exists in the 3 bit register, and 3 multiplexors to output the correct three bit pattern from the set of five bits held in the 3 bit and 2 bit registers. A state machine is used to control the process and to verify that at least 2 successive synchronization patterns are identical before the multiplex state is selected.

Preferably, the EOP pattern is chosen to match the specific soft error rate in the system and is typically performed using exhaustive computer searching. One practice is to develop a computer program which first constructs all possible patterns, within code constraints of the chosen recording code (for example, the so-called 1,7 recording code), starting with the shortest of the possible patterns. Then, each of the possible patterns is examined by calculating the autocorrelation value for several cases. The cases considered are all one, which may normally be encountered in system operation. The case of perfect synchronization provides one reference against which other cases are compared. The other cases are all imperfect synchronization, i.e. with the pattern shifted in time. The cases of most interest are ones in which the tested pattern is shifted in time preceding perfect synchronization. Note that time shifts are discrete. On the prior art, each bit time preceding perfect synchronization is examined. In the system of the present invention, each k bit times preceding perfect synchronization is examined since pre-synchronization insures that autocorrelation values need be considered only every k bit time. Note that k is the number of bits in the repeated preamble pattern, which is pre-synchronized. After calculation of autocorrelation values, the maximum difference, or distance, is calculated between the autocorrelation value at perfect synchronization and autocorrelation values at all interesting degrees of imperfect synchronization. This maximum difference represents the error tolerance which the examined pattern exhibits. The computer then selects the pattern or patterns which exhibit the largest difference and provides an output describing the pattern and its difference.

With a repetitive 3T preamble terminating with a complete 010 pattern, for example, and using the 1, 7 recording code which requires the encoded data input of three bit groups for subsequent decode, a 24 bit EOP pattern is developed: 100101001000100010101010, with the left most bit immediately following the preamble. In the present embodiment, the EOP detector examines bits in the trial EOP only in the one bit positions of the expected EOP. There are nine such bit positions, so m=9. Accepting any five 1 bits out of the nine bit positions is sufficient to declare synchronization, sets n=5. Therefore, $$\frac{9!}{5!(9-5)!} = \frac{9!}{5!4!} = \frac{362880}{120 \cdot 24} = 126$$

possible combinations of 5 "one" bits which are acceptable. Due to pre-synchronization, data is examined only at every third possible permutation of bits, that is, at every third offset from the true synchronized position. For example, as illustrated in FIG. 3, only the bit sequences shown are examined by the EOP detection logic.

Figure 3:
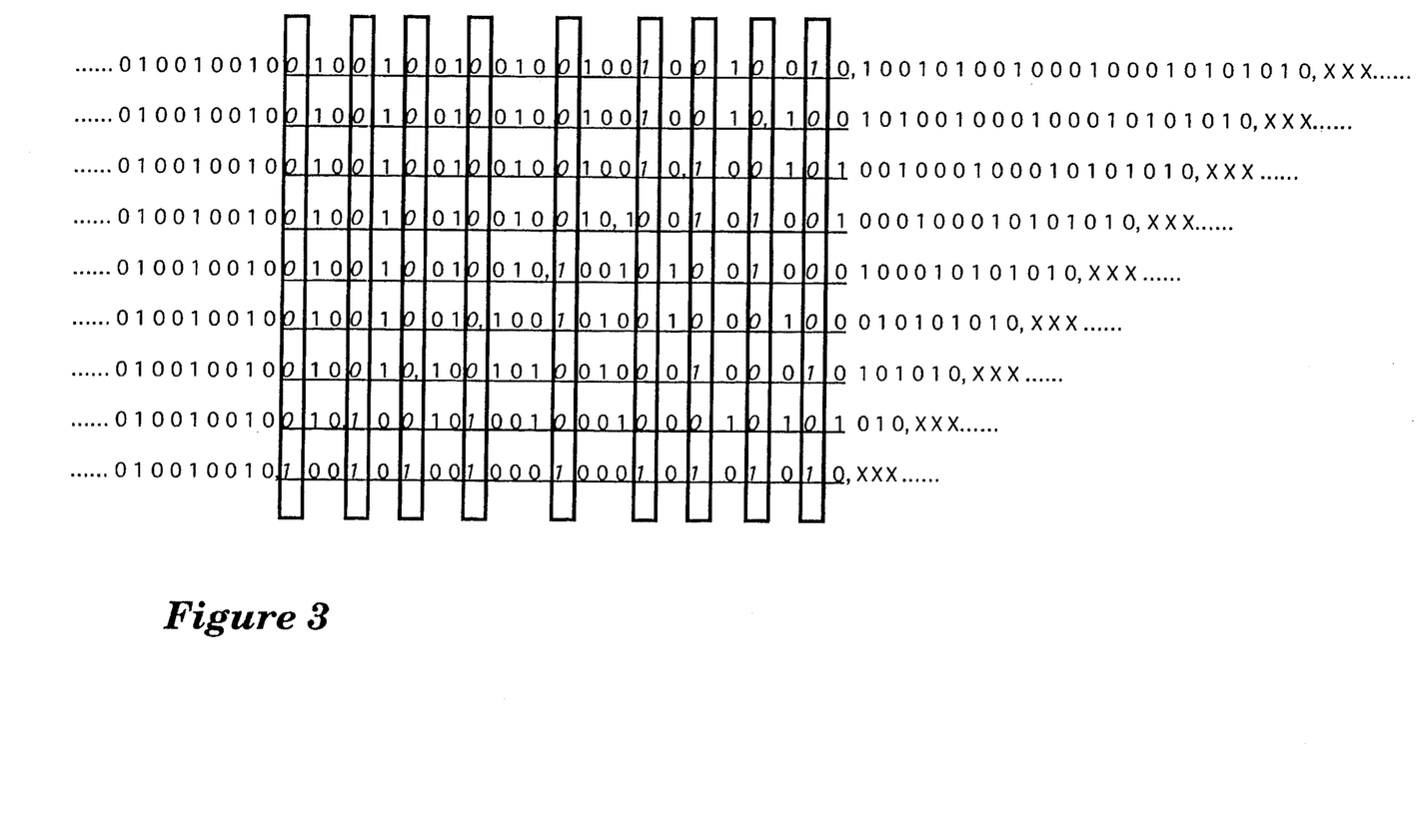
FIG. 3 is an illustration of bit sequences examined in the embodiment of the present invention.

Referring to FIG. 3, the true EOP is located in each row of bits between commas. Bits to the left of the EOP are in the preamble. X's following the EOP are unknown encoded data bits. Bits within the underlined area are those in the examining area. However, only the bits shown in italics are actually examined for presence of a "one" bit. It should be noted that the other 3 bit offsets of the examination area to the left create cases exactly like the top row, that is examinations are all in the preamble with repetitive 3 bit offsets, so that these additional cases are not shown. Starting with the bottom row, offsets of the examination area to the right into the data are of no interest since the offsets necessarily imply that mis-synchronization has already occurred. It is easy to see that for each of the above unsynchronized sequences examined, there are no more than 2 legitimate "one" bits in the "one" bit positions, whereas for a correctly synchronized sequence there are 9 legitimate "one" bits in the "one" bit positions. Therefore, in the present embodiment, four dropped "one" bits and 2 inserted "one" bits can be tolerated while still being able to synchronize.

Alternately, it would be possible to accept any six-one bits or any other number of "one" bits out of the nine examined. Furthermore, the string can be examined for the presence of both 1's and 0's. This embodiment would require additional logic, but a shorter EOP can be used. Therefore, the requirements of the application, as well as the amount of logic versus the length of EOP, can be used to determine the logic and EOP used.

If the two step synchronization process of the present invention was not used to achieve this degree of tolerance, a pattern of at least 32 bits would have been required. More "one" bits would be present in such a pattern because the best patterns found so far for conventional EOP detection using a 31-bit pattern have at least 10 one bits. Therefore, it is likely that more than 10 "one" bits would be required.

Figure 4:
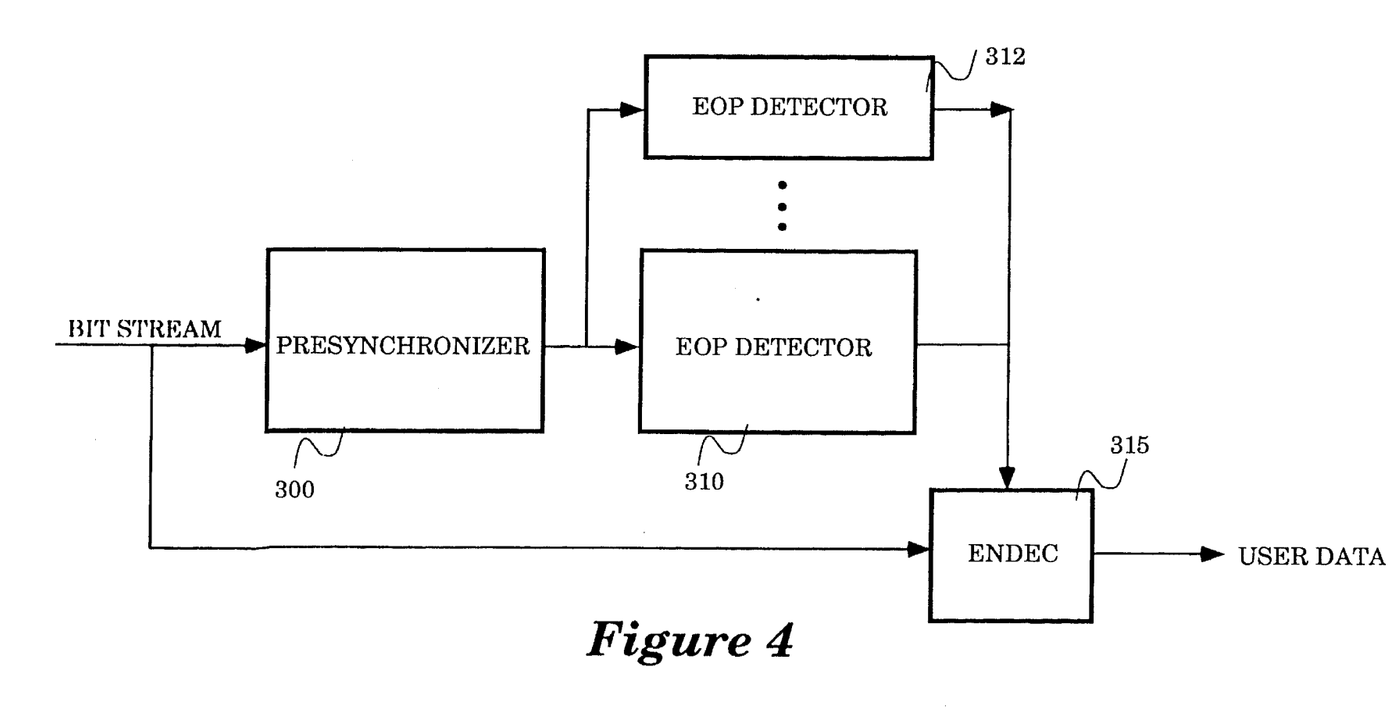
FIG. 4 is a block diagram description of an embodiment of the present invention.
Figure 5A:
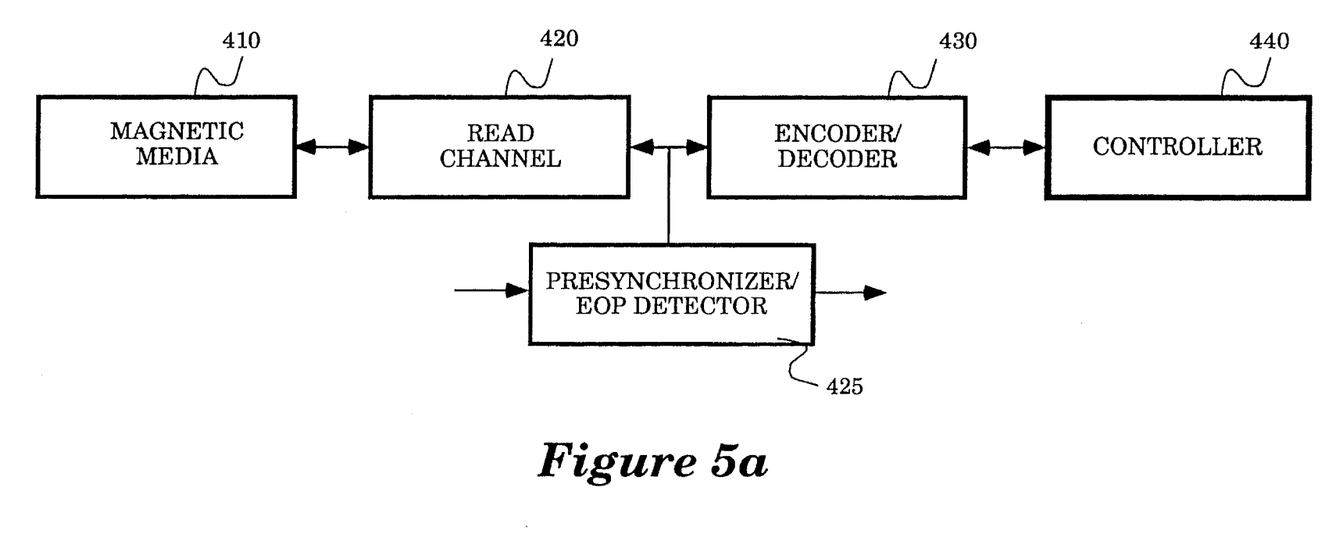
FIGS. 5a and 5b are block diagram descriptions of the system utilizing the synchronizer of the present invention.
Figure 5B:
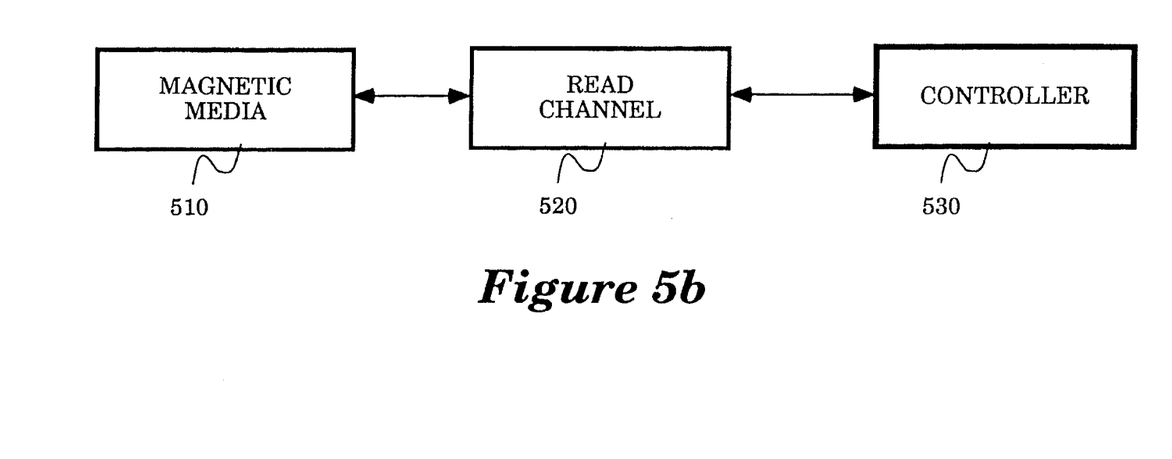

In accordance with the process described, and as shown in FIG. 4, a presynchronizer 300 is used to perform a pre-synchronization such that the EOP pattern can be shortened and still accurately detect the start of data. Once presynchronized, the EOP detectors 310–312 detect the EOP pattern and causes the remainder of the bit stream containing user data to be forwarded to the ENDEC 315. The number of EOP detectors needed is determined according to the number of possible combinations. The pre-synchronizer and the EOP detector can be located in a plurality of places within the system. For example, referring to FIG. 5a., the read channel 420 reads and writes data to and from the magnetic media 410. The data is put through the ENDEC 430 and to the controller 440 which forwards the data to the system or process requesting the data. In this embodiment, the pre-synchronizer and EOP detector 425 are configured as a separate circuit just prior to the ENDEC or at the ENDEC as the ENDEC functions with a data separator for clock extraction and detection of bits. Alternately, as shown in FIG. 5b, the data read from the magnetic media 510 by the read channel 520, forwarded to the controller 530. In this embodiment, the controller includes the logic for pre-synchronization and detection of the EOP.

Therefore, with a shorter EOP pattern and less system logic, a greater error tolerance is achieved. It is readily apparent that the invention is not limited to the 3T pattern; other patterns for pre-synchronization, such as 2T, T, etc. can be used. It follows that if a pattern of, for example, 4T is used, the EOP detector would examine every fourth bit time as the pre-synchronization step will detect the beginning of that boundary. Furthermore, it is apparent that different EOP patterns of different lengths and different error tolerances can be utilized.

The invention has been described in conjunction with the preferred embodiment. It is evident that numerous alternatives, modifications, variations and uses will be apparent those skilled in the art in light of the foregoing description.

What is claimed is:

1. A method for detecting the beginning of data in a bit stream, wherein the bit stream comprises sequences of a preamble, byte synch and data, wherein the byte synch comprises an EOP bit sequence which identifies the end of the preamble and the beginning of the data, said method comprising the steps of:

determining a frequency and phase related to the bit stream for clock synchronization;

wherein said step of determining is completed within an initial portion of a pattern of bits in the preamble, said pattern being a repetition of instances of a specific bit string having a bit with a first value and one or more bits having a different second value;

performing EOP searches to detect a first occurrence of said EOP bit sequence in said bit stream, wherein at least one of said EOP searches commences at a first bit position within said bit stream, said first bit position separated by a second bit position from a third bit position at which a next EOP search is commenced, wherein no EOP search commences at said second bit position; and determining where the data begins in the bit stream using an EOP bit sequence detected in one of said EOP searches;

wherein said step of performing EOP searches allows an EOP bit sequence to be used which is shorter than a bit sequence which would be required if an EOP search were commenced at said second bit position.

2. The method as set forth in claim 1, wherein said specific bit string comprises a 3T pattern.

3. The method as set forth in claim 1, wherein the EOP bit sequence is 24 bits in length.

4. The method as set forth in claim 1, wherein the step of performing comprises using an autocorrelation process for autocorrelating said EOP bit sequence with a bit substring at one or more bit positions in said preamble.

5. The method as set forth in claim 1, wherein the step of performing includes determining only a matching of ones in bit positions of a bit sequence beyond said initial portion with ones in corresponding bit positions of said EOP bit sequence to detect said first occurrence of said EOP bit sequence.

6. The method as set forth in claim 1, wherein the step of performing includes the step of determining a likelihood of whether a bit substring within said bit stream matches said EOP bit sequence.

7. The method as set forth in claim 1, wherein the step of performing includes matching values in bit positions in said EOP bit sequence on a bit by bit basis with values in corresponding bit positions in a segment of said bit stream.

8. The method as set forth in claim 1, wherein the step of performing includes, at each initial bit position where an EOP search commences, comparing bit positions, having a predetermined bit position offset from said initial bit position, with corresponding bit positions of said EOP bit sequence for determining a match with said EOP bit sequence, wherein said match can be less than exact but is within a predetermined error tolerance.

9. A method for detecting the beginning of data in a bit stream, wherein the bit stream comprises sequences of a preamble, byte synch and data, wherein the byte synch comprises an EOP bit sequence having bits of a first value and bits of a different second value which identifies the end of the preamble and the beginning of data, said method comprising the steps of:

determining a frequency and phase related to the bit stream for synchronizing a clock for the system;

wherein said step of determining is completed using an initial portion of a pattern of bits in the preamble by synchronizing the clock based on a predetermined bit position in each instance of a specific bit sequence repeated in the pattern of bits in the preamble;

searching, following said step of determining, for said EOP bit sequence in said bit stream at a location of said predetermined bit position in additional instances of said specific bit sequence occurring beyond said initial portion, said predetermined bit position indicative of a possible start of an occurrence of said EOP bit sequence, wherein said step of searching includes searching for only the bits of said EOP bit sequence having said first value;

detecting the existence of said EOP bit sequence to determine the start of data which begins after said EOP bit sequence.

10. An apparatus for use in locating data in a string of bits comprising a preamble, an EOP bit sequence having bits of a first value and bits of a different second value, and the data, said data occurring after the EOP bit sequence, said apparatus comprising:

means for determining a frequency and phase related to the string of bits by detecting a predetermined bit position in instances of a specific bit sequence repeated in the preamble, wherein said means for determining is used for synchronizing a clock for said apparatus to said frequency and phase, the clock being synchronized in an initial portion of the preamble to occurrences of said predetermined bit position;

EOP detector means for determining a likelihood of whether a substring in said string of bits, beginning at a first bit position in any one of said instances and having a bit length equal to said EOP bit sequence, represents said EOP bit sequence wherein said EOP detector means examines less than all bit positions of the substring in determining a likelihood that the substring represents said EOP bit sequence;

pre-synchronizer means for (a) locating additional instances of said specific bit sequence in said preamble beyond said initial portion, and (b) activating said EOP detector means for one or more of said additional instances, wherein less than every bit position is used as said first position.

11. The apparatus as set forth in claim 10, wherein K=3.

12. The apparatus as set forth in claim 10, wherein the pre-synchronizer means examines for the presence of ones in the preamble in order to locate each of said additional instances.

13. The apparatus as set forth in claim 10, wherein said EOP detector means compares said bits having said first value in said EOP bit sequence to bits in corresponding bit positions in said substring but does not compare said bits having said second value in said EOP bit sequence to bits in corresponding bit positions in said substring.

14. The apparatus as set forth in claim 10, wherein said pre-synchronizer means and EOP detector means are located within a controller.

15. An apparatus as claimed in claim 10, wherein said additional instances include a KT pattern, K≧1, wherein each said additional instance includes K-1 "zero" bits and a "one" bit, the "one" bit used to identify the additional instance.

16. An apparatus as claimed in claim 10, wherein said EOP detector means includes a fault tolerant detection means for determining whether said substring represents said EOP bit sequence based on said likelihood.

17. A method as claimed in claim 1, wherein said step of performing EOP searches includes using a fault tolerant detection process in searching for said EOP bit sequence so that a bit substring in said bit stream may be detected as said first occurrence of said EOP bit sequence even though said bit substring does not match said EOP bit sequence in all compared bit positions.

* * * * *